May 19, 1970 R. B. HENDERSON 3,512,777
GAME BALL
Filed Sept. 11, 1964 3 Sheets-Sheet 1
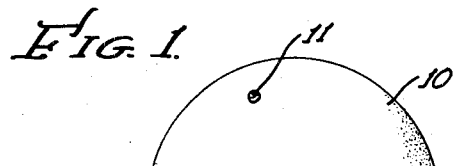
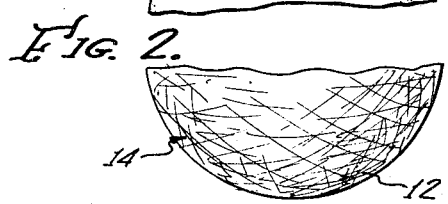
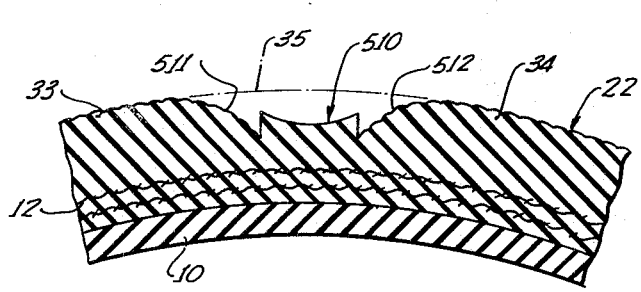
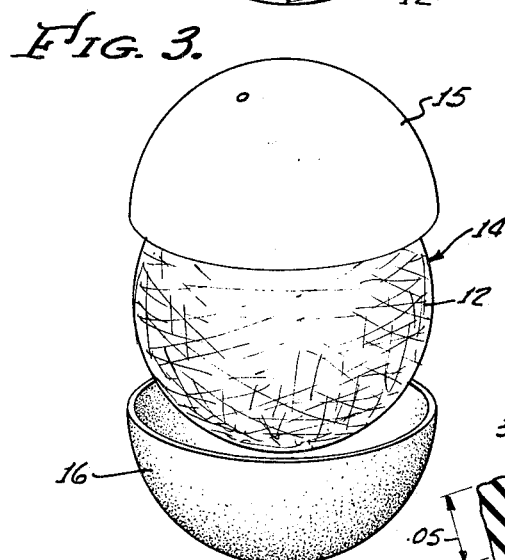
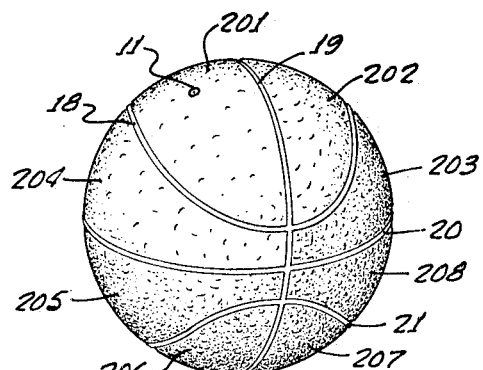
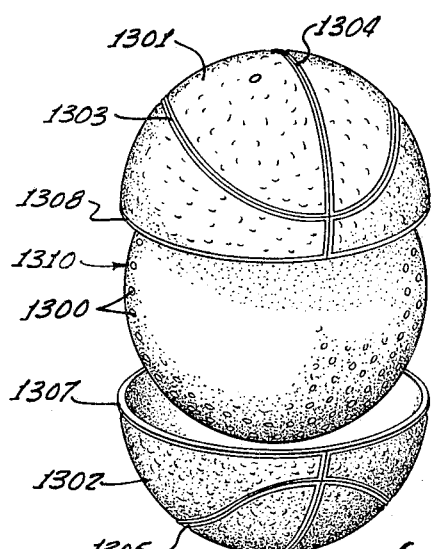
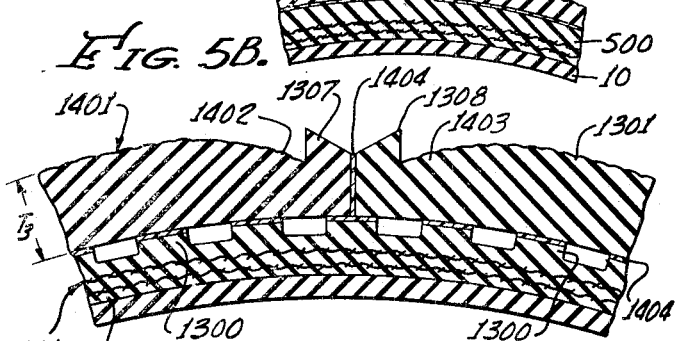
INVENTOR.
ROBERT B. HENDERSON
BY
ATTORNEY.

May 19, 1970 R. B. HENDERSON 3,512,777
GAME BALL
Filed Sept. 11, 1964 3 Sheets-Sheet 2
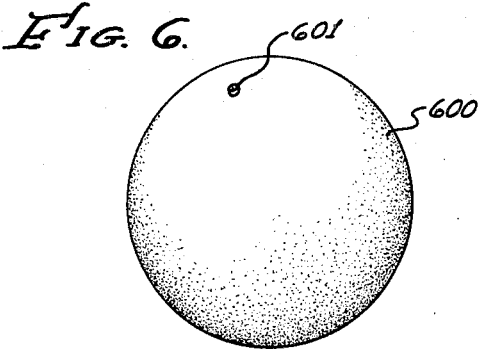
FIG. 6.
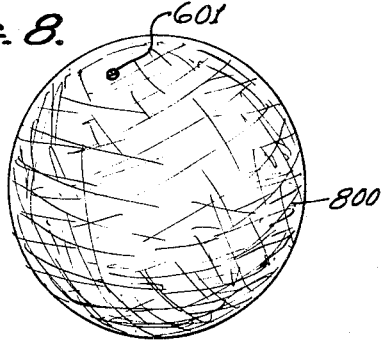
FIG. 8.
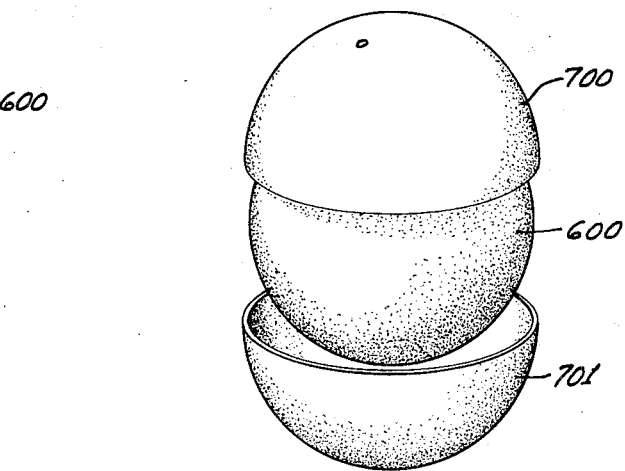
FIG. 7.
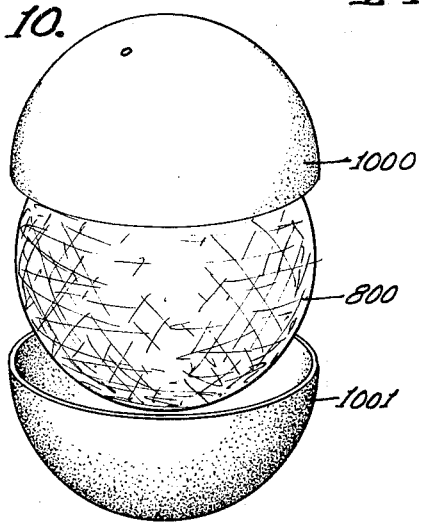
FIG. 10.
FIG. 9.
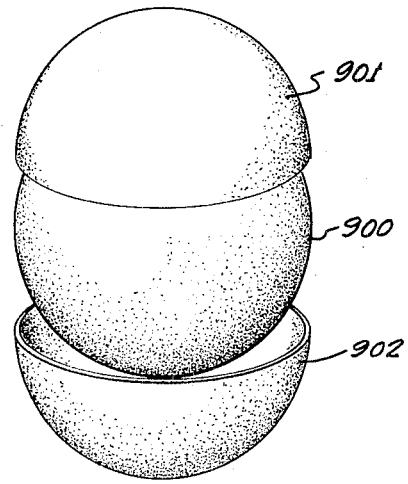
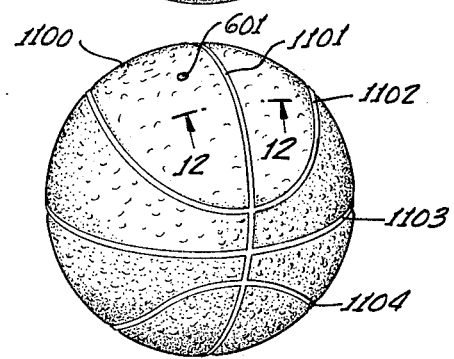
FIG. 11.
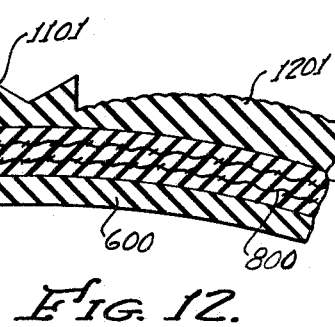
FIG. 12.
INVENTOR.
ROBERT B. HENDERSON
BY Nicholas T Volk
ATTORNEY.

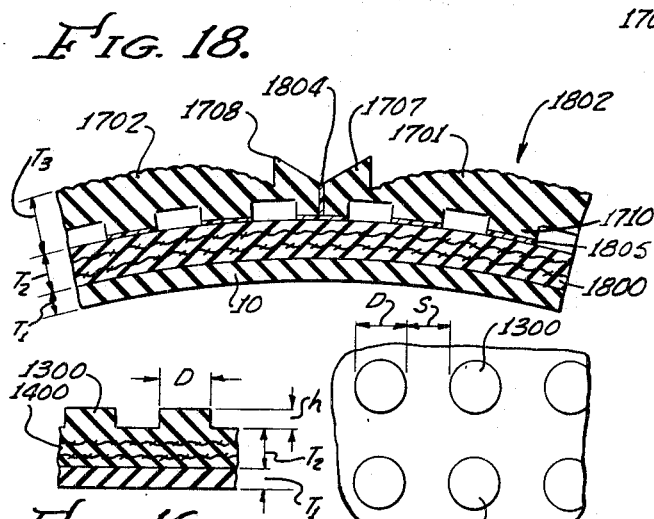
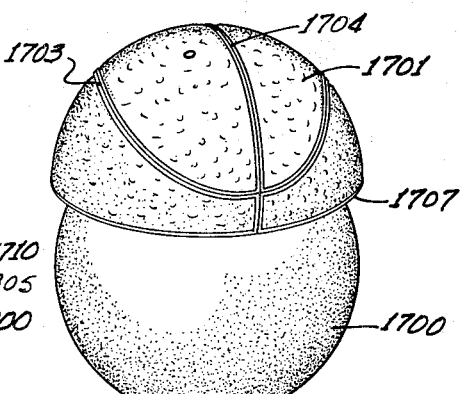
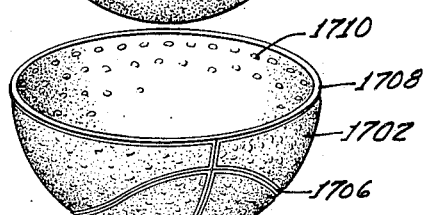
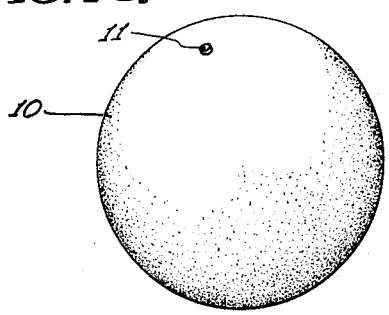
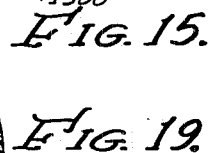
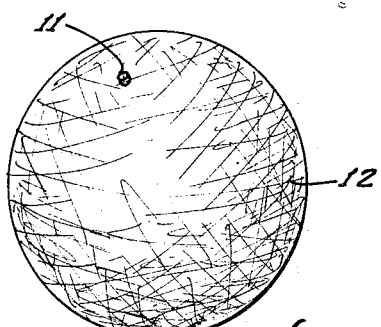
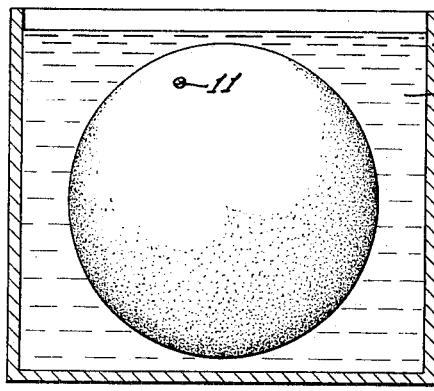
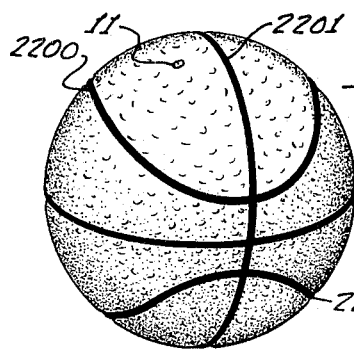
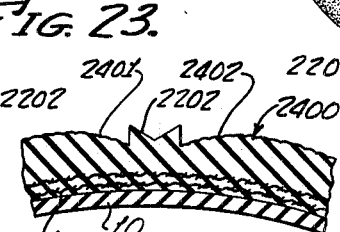
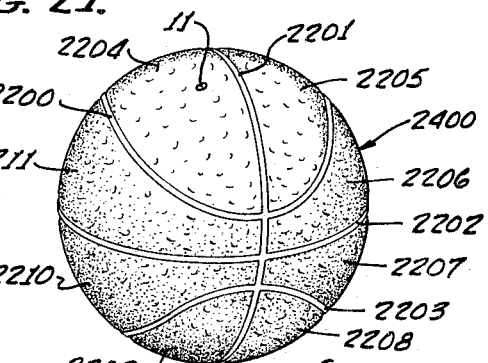
INVENTOR.
ROBERT B. HENDERSON
BY
Nicholas T Vohr
ATTORNEY.

United States Patent Office 3,512,777
Patented May 19, 1970

3,512,777
GAME BALL
Robert Bruce Henderson, Newport Beach, Calif., assignor to W. J. Voit Rubber Corporation, a corporation of California
Filed Sept. 11, 1964, Ser. No. 395,677
Int. Cl. A63b *41/10, 41/08*
U.S. Cl. 273—65         3 Claims

ABSTRACT OF THE DISCLOSURE

An inflatable game ball in which raised simulated seams and the outer cover panels are all molded at the same time. The panels include inwardly projecting depressions directly in the vicinity of the raised seams.

---

This invention relates to air inflated balls and, more particularly, to the type of balls which generally have either real or simulated seams present on their covers.

The balls of the above type are either basketballs, volleyballs, or footballs. Originally, balls of this type had their covers made of leather panels, and since only small panels can be imparted sufficiently curved surfaces, a plurality of panels was required to produce a spherical envelope or a cover, with the panels being joined to each other by means of either machine or hand-sewn seams. Seams of this type produced inwardly projecting grooves along the seam. The simulated seams are produced by first molding a reinforced casing with the outwardly projecting ridges or "seams," and then cementing a plurality of panels over the sectors defined by the outwardly projecting ridges of the molded seams. Panels of the above type in the high quality balls are made of leather, and in the less expensive balls they are made of elastomers such as rubber or synthetic resins. According to the prior art, the edges of the panels in the balls with the cemented panels are skived so that the ridges separating adjacent panels project slightly above the panels, but do not project above the spherical surface of the ball.

It has been also customary in the prior art to imitate the seams in the balls having molded covers by producing along several great circles slight depressions in the molded surface of the cover and then painting the created grooves with black paint or ink, which is usually either a natural or a synthetic rubber cement, for delineating the panels from each other. In the balls of the above type, the wall structure of the ball is weakened along the seam lines, since the ball tends to bend along the seams more readily than elsewhere because of the created depressions in the cover, with the result that such preferential flexing of the wall along the seams results in premature failure of the covers along these seam lines. The outward appearance of the balls with such inwardly depressed simulated seams does not compare favorably with the balls having projecting simulated seams and, therefore, such balls are relegated to lower quality and price balls. Moreover, since the depressions are not especially pronounced, it becomes difficult to devise any suitable mechanical means for painting the seams. They are, therefore, painted manually, with the concomitant increase in the cost of such balls in spite of the lower grade of the end product.

This invention discloses balls in which the simulated seams and the covers, including simulated panels, are all molded at the same time, and the simultaneously molded panels are provided with inwardly projecting depressions directly in the vicinity of the thus projecting ridges, with the result that the entire molded cover authentically reproduces in every detail the appearance of the type of wall construction used in the expensive balls with the raised ridges and cemented, skived leather or rubber panels. The simulated seams project sufficiently over the immediately adjacent surface of the ball for ready mechanical painting of the seams with the aid of rollers, which are guided by the seam edges, so to speak, in a monorail manner.

This invention also discloses balls in which the wall construction includes spacers either on the inner surface of the cover or on the outer surface of the carcass for providing a partially air-filled and partially spacer-filled cushioning layer between the carcass and the cover.

It is therefore an object of this invention to provide authentic appearing reproductions of the type of balls in which the outer cover is composed of a plurality of panels separated from each other by ridges, or, as they are called in the trade, "seams," these reproductions or seam simulations projecting from that portion of the cover which is adjacent to the ridges, being produced by molding the entire cover as a single unit in one method and as a hemispheric element in the other method with the molded cover including the projecting seams, or ridges, and imitations of the skived panels, with the result that the compound convexity of the molded panels is increased adjacent to and along the projecting ridges, or seams, on the cover.

It is also an object of this invention to provide balls which also includes the introduction of spacers between the ball carcass and the cover for providing a cushioning layer under the cover.

Referring to the drawings:

FIGS. 1, 2, 3, and 4 illustrate perspective views of the ball in its successive stages of manufacture in accordance with the first method;

FIGS. 5 and 5A are enlarged sectional views of the wall of the ball, including the seam, produced in accordance with the first method illustrated in FIGS. 1 to 4;

FIG. 5B is an exemplanatory figure and is a cross-sectional view of a ball built in accordance with the known prior art methods;

FIGS. 6 through 11 are perspective views of the ball in its successive stages of manufacture according to the second and third methods;

FIG. 12 is the sectional view of the wall structure including a seam produced in accordance with the manufacturing steps illustrated in FIGS. 6 through 11;

FIG. 13 illustrates a perspective view of the ball carcass and of two hemispheric covers in spaced relationship with respect to the ball carcass provided with projecting spacers; this figure illustrating the fourth method of manufacturing the ball;

FIG. 14 is a transverse section of the ball's wall, including a seam, produced according to the fourth method illustrated, in part, in FIG. 13;

FIG. 15 is a perspective view of the ball carcass and two hemispheric covers with projecting spacers on the inner surface of the cover illustrating the fifth method of producing balls;

FIG. 16 is a transverse section of the ball's wall produced in accordance with the method illustrated in FIG. 15, the section including a joint between the two hemispheres and a simulated seam projecting outwardly from the ball cover;

FIGS. 17, 18, 19, 20, and 21 illustrate the sixth method of producing a ball in which the manufacturing steps illustrate the perspective views of the ball in its various stages of manufacture;

FIG. 22 is a sectional view of the ball produced in accordance with the method illustrated in FIGS. 17 through 21, the section including a simulated seam and adjacent cover panels.

Referring to FIGS. 1 through 5, according to the first method of producing the ball with the projecting seam, a bladder 10 illustrated in FIG. 1 is provided with an air valve 11. This bladder may be of any conventional type, preferably made of butyl rubber for good retention of air under pressure, and is made in any known conventional manner. This bladder is fully cured in a known manner, and then covered with a reinforcing winding 12 illustrated in FIG. 2. The resulting carcass 14 is then covered with two hemispheric members 15 and 16, preferably made of natural rubber, and thereafter the carcass is compression molded in a mold which has appropriate recesses and projections so as to produce a plurality of projecting seams 18, 19, 20, and 21 and panels 201–207 on the cover of the ball.

The transverse section of the wall structure produced in accordance with the first method is illustrated in FIG. 5. It includes the bladder 10, the winding 12 and the molded outer cover 22, which has the projecting seam 19. The seam is provided with a central groove 24, and edges 25 and 26, which project sufficiently so as to be substantially at the spherical envelope 35 of the ball, or, stated differently, the radius R of the ball at the edges 25 and 26 is substantially equal to the radius of the ball. This radius is the radius of the panels beyond the inwardly depressed compoundly convex surfaces 28 and 29 which are adjacent to and are on both sides of seam 19. The height, $h$, of the seam is from .3″ to .33″ in FIG. 5. It It would be also proper to define the height, $h$, by stating that panels 33 and 34, next to seam 19, are below by .3″ to .33″ the spherical surface 35 which defines the dimensions of the sphere represented by the ball. The position of this sphere is illustrated by dotted line 35 in FIG. 5. In this manner a player is given an opportunity to feel with his fingertips the projecting edges 25 and 26 of seam 19 which enables him to handle the ball more effectively than when the entire ball is completely spherical and has no seams of any kind. Therefore, the seams of the type such as seam 19 have a dual function: they facilitate handling of the ball by the player, and they also enhance the appearance of the ball. It is also claimed that such seams improve the aerodynamic characteristics of the ball.

FIG. 5A illustrates the same construction of the wall except that the seam 510 now has been depressed below line 35 and the depressed portions 511 and 512 now have a smaller radius than the corresponding depressed portions 29 and 28 in FIG. 5. Also, while in FIG. 5, the cross-section of seam 19 is V-shaped, it is circular in FIG. 5A.

It may be seen that the resulting cover of the ball, insofar as its external surface is concerned, is identical to the cover produced when the carcass is first produced with the projecting seams, such as seam 19, and then either leather, rubber, or synthetic resin panels are applied to the carcass by cementing such panels over the surfaces, or sectors, defined by the projecting seams.

According to the prior art, the ball, of the type illustrated in FIG. 5, would have a cross-sectional view illustrated in FIG. 5B. The wall structure, according to the prior art, has a bladder 10, a carcass 500 with the projecting seam 501, and cemented skived panels 502 and 503 which are separate and distinct from the carcass 500.

When FIGS. 5 and 5A are compared with FIG. 5B, they reveal the fact that in FIGS. 5 and 5A, the skived panels 502 and 503, seam 501 and carcass 500 of FIG. 5B constitute one single molded piece surrounding and positively molded to the bladder 10.

From the above, it follows that manual application of panels, such as panels 502, 503, etc., is eliminated altogether according to the method illustrated in FIGS. 1 through 5A and yet it produces the ball having the same external appearance as the ball illustrated in FIG. 5B, but having a longer life.

From a practical point of view, the ball produced in accordance with the first method illustrated in FIGS. 1 to 5 and 5A is superior to that illustrated in FIG. 5B since the cover, the carcass, and the seams constitute one single piece of molded material which will withstand more wear and tear than the structure illustrated in FIG. 5B. This is especially so when one takes into consideration the fact that the cemented panels 502 and 503 always have a tendency of separating themselves from carcass 500 along the skived edges 506 and 507 of the panels. No such skived edges are present in FIGS. 5 and 5A and for this reason, the resulting ball has a longer life than that illustrated in FIG. 5B.

Actual tests indicate that while the ball of FIG. 5B can withstand from 60,000 to 125,000 bounces when the panels are leather panels and from 100,000 to 225,000 bounces when the panels are rubber panels, the ball of FIGS. 5 and 5A can withstand in the order of 400,000 bounces. Yet the cost of producing the panels in accordance with the methods illustrated in FIGS. 1 through 5A, as compared to the manual cementing of panels, is approximately 12 times less because of the elimination of many manually performed steps required by the ball shown in FIG. 5B.

It is to be noted here that if the panels 502 and 503 are to be leather panels, then there is no alternative but to use the old method of construction wherein the individual panels are skived and cemented to the respective eight sectors on the surface of the ball, such as the sectors 201 through 207 appearing in FIG. 4.

FIGS. 6 through 12 illustrate the steps which are used for making a ball of the above type according to the second method. A bladder 600 is made in a conventional manner from butyl rubber and fully cured so that it can be inflated through a valve 601 in the manner illustrated in FIG. 6. Two hemispheric members 700 and 701, preferably made of natural uncured rubber, are then placed over the bladder 600. After the application of the two uncured hemispheres 700 and 701 to bladder 600, a winding 800 is applied to the ball, and the resulting structure is then cured to produce the spherical carcass 900 illustrated in FIG. 9, the natural rubber penetrating the winding in the process of curing and covering it completely, so that only a smooth rubber surface is visible in FIG. 9. Carcass 900 is then again covered with the natural rubber hemispheric shells 901 and 902, FIG. 9, and then again cured so as to produce a finished ball 1100 except for coloring of the seams 1101 through 1104. Subsequent coloring of the seams completes the ball. The cross-sectional view of the wall structure is illustrated in FIG. 12, which includes the bladder 600, the winding 800 imbedded in a layer 1200 which is the combination of the hemispheres 700 and 701 and winding 800, and a molded cover 1201. In this case, the winding 800 is imbedded solely in the material furnished by the hemispheres 700 and 701. As soon as the ball illustrated in FIG. 8 is cured so as to produce carcass 900, and only after such complete curing, the additional two shells 901 and 902 are applied over the fully cured carcass 900.

It is also possible to omit the step illustrated in FIG. 9 and proceed directly from FIG. 8 to FIG. 10 by applying the hemispheres 1000 and 1001 directly over the winding 800, which is the step illustrated in FIG. 10, with winding 800 being still visible in FIG. 10.

Even when step 9 is eliminated altogether, and the manufacturing steps include FIGS. 6, 7, 8, 10, and 11, winding 800 still imbeds itself in the main in the hemispheric shells 700 and 701 and only to a limited extent in the shells 1000 and 1001 because of the inability of winding 800 to expand and free expansion of bladder 600, which then presses shells 700 and 701 into the winding.

Comparison of FIG. 5 with FIG. 12 indicates that the only difference between these figures resides in the fact that while winding 800 now is imbedded in the layer 1200 in FIG. 12 rather than the external outer cover 1201 because of the use of the shells 700 and 701 in connection with the second method, in FIG. 5 it is imbedded in the cover.

FIGS. 13, 14, 15, and 16 illustrate still another method of making air-inflated balls. This method includes the steps illustrated in FIGS. 1, 2, 3, 13, and 14, with two additional steps being only partly illustrated in the above series of figures. Bladder 10 is fully cured and then is covered with the winding 12, as in FIGS. 1 and 2. Two hemispheric shells 15 and 16 of soft natural or synthetic rubber are then applied over the winding, as illustrated in FIG. 3, and the ball is then cured in a mold which is provided with a plurality of circular indentations producing a corresponding plurality of circular projections, or spacers, 1300, FIG. 13, on the surface of the cured carcass. The plan view of the spacers 1300 is illustrated in FIG. 15, and their cross-section is illustrated in FIGS. 16 and 14. FIG. 15 illustrates the dimensions D and S, D being the diameter of the spacers and S being the spacing between adjacent spacers 1300. The cross-sectional view of the spacers is illustrated in FIG. 16, which also indicates their height $h$, bladder thickness $T_1$, and the thickness $T_2$ of the intermediate layer 1400. FIG. 14 also illustrates the thickness $T_3$ of the outer cover. The range of suitable dimensions for D, S, and $h$ are as follows:

$D = 3/16'' - 3/8''$
$S = 1/32'' - 1/4''$
$h = .002'' - .045''$

Limits for $T_1$, $T_2$, and intermediate $T_3$, when the ball is a basketball, are as follows:

$T_1 = .015'' - .040''$
$T_2 = .010'' - .045''$
$T_3 = .010'' - .075''$

For a more detailed description of the wall structure using spacers 1300, reference is made to the co-pending application of Myron W. Barton, Ser. No. 243,779, filed Dec. 11, 1962, now Pat. No. 3,256,019, and entitled "Ball With a Wall Structure Having an Undercover Member With Spacers."

The cover member 1401 is obtained by first making, in a suitable compression mold, two fully cured hemispheric members 1301 and 1302, both of which are provided with suitable seams 1303, 1304, 1305, 1306, and half seam members 1307 and 1308. The mold is so constructed that suitable inwardly projecting compoundly convex depressions 1402 and 1403 are obtained adjacent to all of the seam members 1303–1308. The fully cured hemispheres 1301 and 1302 are then placed over the carcass 1310 and cemented to the carcass by means of layer of cement 1404 which is applied to the projecting spacers 1300, the inner surfaces of the hemispheres 1301 and 1302, and also to the abutting edges of the half seams 1307 and 1308.

The resulting cross-sectional view of the wall is illustrated in FIG. 14 with the bladder 10 being adjacent to the soft intermediate layer 1400 having spacers 1300 cemented to the outer cover 1401 composed of two hemispherical shells 1301 and 1302, the two shells being cemented to the soft intermediate layer 1400 by means of cement 1404.

FIGS. 17 and 18 illustrate another version of producing a ball provided with the spacers 1710. A carcass 1700 is produced in accordance with the steps illustrated in FIGS. 6, 7, 8, and 9, which include surrounding the bladder 600 with two hemispherical members 700 and 701, then applying a winding 800 over the hemispherical members 700 and 701, and then curing this structure to obtain a carcass 900. This carcass 900 corresponds to carcass 1700 illustrated in FIG. 17. Two hemispherical members 1701 and 1702 are then molded in a mold provided with the seam indentations to produce a plurality of seams 1703, 1704, 1705, 1706, 1707, and 1708, which correspond to the identical seam members 1303–1308 described previously in connection with the description of FIG. 13. The spacers 1710 now are provided on the inner surface of the hemispheres 1701 and 1702, with the result that the cross-sectional view of the wall produced according to this method is of the type illustrated in FIG. 18, which includes bladder 10, an intermediate layer 1800 with the imbedded winding and the outer cover 1802 cemented to the intermediate layer 1800, including the two hemispherical shells 1701 and 1702 provided with spacers 1710. The circular edges of the two hemispheres 1701 and 1702 are cemented together by means of a cement layer 1804, and the spacers 1710 are cemented to the intermediate layer 1800 by means of a cement layer 1805.

FIGS. 19 through 24 illustrate another method of producing a ball with the cover including projecting seams. A bladder 10 is covered with a winding 12, as in FIGS. 1 and 2, and the ball is then immersed in a container 2100 filled with a polyvinyl chloride plastisol 2101. The viscosity of the plastisol is adjusted so as to deposit a suitable amount of plastisol on the surface of the ball and also to penetrate the interstices in the winding layer 12. It is also possible to apply plastisol from a spray gun, whereupon the ball is molded in the mold so as to produce projecting seams 2200, 2201, 2202, 2203, and panels 2204–2211, all of the above elements constituting one single molded cover 2400, illustrated in cross-sectional view in FIG. 24.

FIG. 23 illustrates the last step, which is painting of the seams 2201–2203 with a suitable elastomeric black ink so as to contrast them from the color of the panels, which are generally colored bright orange whenever the ball is a basketball.

The cross-sectional view of the wall produced after the steps illustrated in FIGS. 19 through 23 are completed is shown in FIG. 24.

In the ball produced according to this method, the only elements of the ball are bladder 10 and the composite cover layer 2400, which also includes the imbedded winding 12. As in the earlier figures, the wall is provided with depressions 2401 and 2402 adjacent to the seam members.

Since the most suitable material for impregnating the winding in the manner illustrated in FIG. 21 is polyvinyl chloride plastisol, it is preferable to make bladder 10 now of a blended composition including nitrile rubber and polyvinyl chloride, since such bladder can make a fused bond with the plastisol when the plastisol is compression molded. Such bladder is disclosed in the co-pending application Ser. No. 167,399, filed Jan. 19, 1962, and entitled "Ball, Ball Bladders, and the Method of Making Them," by Jack W. Way, assigned to the same assignee.

The disclosed balls having simulated seams produced in the manner disclosed here have a much longer life than the balls of the prior art having cemented panels of the type shown in FIG. 5B at 502 and 503. As mentioned previously, balls produced according to this invention withstand approximately 400,000 bounces in the test machine as compared to 60,000 to 225,000 bounces for the balls with cemented panels.

Although the balls produced according to this invention have longer life and better appearance than the balls having the manually cemented panels, they are less expensive to produce, since all manual labor in cutting out the panels, skiving the panels, and cementing each and every panel, and knurling the skived portion of the panels at the seam portions is eliminated. This produces a very marked reduction in cost in producing the balls, which, at the very same time, are superior in their performance and appearance to the balls of the prior art.

What I claim is:

1. An inflatable spherical game ball having pebbled surface areas and raised simulated full seams, said seams being located between said pebbled surface areas, said pebbled surface areas and said seams comprising a unitary one piece construction molded in situ, said pebbled surface areas, except for the edge portions thereof adjacent the seams, and all of the raised simulated seams having a common surface radius, the edge portions of said pebbled surface areas adjacent said raised simulated seams being tapered inwardly of said common surface radius with their deepest portions touching said raised simulated seams whereby the feel of full seams in a relatively inexpensively manufactured ball is available to a player's fingers and impact and wear forces are uniformly transmitted over the entire surface of the ball.

2. The game ball set forth in claim 1 and wherein said raised simulated seams each comprise a pair of spaced parallel ribs forming a uniformly walled channel therebetween arranged to receive a contrasting color coating.

3. An inflatable game ball having outer cover surface areas and raised simulated seams, said seams being located between said cover surface areas, said cover surface areas and said seams comprising a unitary one piece molded in situ construction, said cover surface areas, except for the edge portions thereof adjacent the seams, having a common surface radius, the edge portions of said cover surface areas adjacent said raised simulated seams being taped inwardly of said common surface radius with their deepest portions touching said raised simulated seams, and said seams extending radially outward from said deepest portions toward said common surface radius.

References Cited

UNITED STATES PATENTS 2,495,079   1/1950   Sonnett et al.
3,256,019   6/1966   Barton.

GEORGE J. MARLO, Primary Examiner

U.S. Cl. X.R.
156—170; 264—319